United States Patent
Trivelpiece et al.

(10) Patent No.: US 11,501,096 B2
(45) Date of Patent: Nov. 15, 2022

(54) METHODS AND APPARATUSES FOR DETERMINING TAG VELOCITY

(71) Applicant: Sensormatic Electronics, LLC, Boca Raton, FL (US)

(72) Inventors: Steve E. Trivelpiece, Rancho Santa Margarita, CA (US); Adam S. Bergman, Boca Raton, FL (US); Manuel A. Soto, Lake Worth, FL (US); Mikhail Polyakov, Boynton Beach, FL (US); John Clark, Boca Raton, FL (US); John A. Allen, Pompano Beach, FL (US); Michael Del Busto, Lake Worth, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/031,453

(22) Filed: Sep. 24, 2020

(65) Prior Publication Data
US 2022/0092281 A1  Mar. 24, 2022

(51) Int. Cl.
*G06K 7/10* (2006.01)

(52) U.S. Cl.
CPC ..... *G06K 7/10396* (2013.01); *G06K 7/10099* (2013.01)

(58) Field of Classification Search
None
See application file for complete search history.

(56) References Cited

U.S. PATENT DOCUMENTS

| | | | | |
|---|---|---|---|---|
| 8,072,311 | B2* | 12/2011 | Sadr | G01S 5/0278 340/10.1 |
| 2007/0121097 | A1* | 5/2007 | Boillot | G01S 15/104 356/28 |
| 2010/0109903 | A1* | 5/2010 | Carrick | G01S 5/14 340/8.1 |
| 2011/0309969 | A1* | 12/2011 | Gravelle | G01S 13/765 342/130 |
| 2012/0256730 | A1* | 10/2012 | Scott | G01S 13/9004 340/10.1 |

(Continued)

OTHER PUBLICATIONS

International Search Report issued in PCT/US2021/071501, dated Jan. 17, 2022.

(Continued)

*Primary Examiner* — Thomas S McCormack
(74) *Attorney, Agent, or Firm* — ArentFox Schiff LLP (57) ABSTRACT

Aspects of the present disclosure include methods, systems, and non-transitory computer readable media for transmitting at least one incident radar signal, receiving at least one reflected radar signal in response to the at least one incident radar signal reflected from a person associated with the RFID tag, determining a first movement vector of the person based on the reflected radar signal, transmitting at least one incident RFID signal, receiving at least one backscattered RFID signal from the RFID tag, determining a second movement vector of the RFID tag based on at least one phase measurement of the at least one backscattered RFID signal, and determining whether the RFID tag is associated with the person based on the first movement vector and the second movement vector.

20 Claims, 4 Drawing Sheets

(56) References Cited

U.S. PATENT DOCUMENTS

2014/0015546 A1* 1/2014 Frederick .............. G01S 13/878
                                                                                  324/642
2018/0052228 A1* 2/2018 Markison ................. H04Q 9/00
2020/0284898 A1* 9/2020 Nanzer ................. G01S 13/003

OTHER PUBLICATIONS

Written Opinion of the International Search Report issued in PCT/US2021/071501, dated Jan. 17, 2022.

* cited by examiner

METHODS AND APPARATUSES FOR DETERMINING TAG VELOCITY

BACKGROUND

A retail store may include a radio frequency identification (RFID) system that uses a RFID reader and RFID tags to track, inventory, and/or manage the items of merchandise in the retail store. The RFID tags may be attached to the items of merchandise. For example, the reader may transmit one or more incident RFID signals to a RFID tag. The RFID tag may respond by backscattering one or more backscattered RFID signals. The RFID reader may measure the received signal strength indication of the one or more backscattered RFID signals to determine the location of the RFID tag (e.g., distance from the RFID reader). Additionally, the retail store may rely on a people counter to track customers exiting the retail store. By tracking customers exiting the retail store and the locations of the RFID tags (and the associated items of merchandise), the retail store may be able to track potential theft and/or loss. However, using RSSI to determine the locations of the RFID tags may be unreliable due to interference. Therefore, improvements in merchandise tracking may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media for transmitting at least one incident radar signal, receiving at least one reflected radar signal in response to the at least one incident radar signal reflected from a person associated with the RFID tag, determining a first movement vector of the person based on the reflected radar signal, transmitting at least one incident RFID signal, receiving at least one backscattered RFID signal from the RFID tag, determining a second movement vector of the RFID tag based on at least one phase measurement of the at least one backscattered RFID signal, and determining whether the RFID tag is associated with the person based on the first movement vector and the second movement vector.

An aspect of the present disclosure includes a method including transmitting at least one incident radar signal, receiving at least one reflected radar signal in response to the at least one incident radar signal reflected from a person associated with the RFID tag, determining a first movement vector of the person based on the reflected radar signal, transmitting at least one incident RFID signal, receiving at least one backscattered RFID signal from the RFID tag, determining a second movement vector of the RFID tag based on at least one phase measurement of the at least one backscattered RFID signal, and determining whether the RFID tag is associated with the person based on the first movement vector and the second movement vector.

Aspects of the present disclosure includes a RFID reader having a radar configured to transmit at least one incident radar signal and receive at least one reflected radar signal in response to the at least one incident radar signal reflected from a person associated with the RFID tag, a RFID driver configured to transmit at least one incident RFID signal and receive at least one backscattered RFID signal from the RFID tag, a processor configured to determine a first movement vector of the person based on the reflected radar signal, determine a second movement vector of the RFID tag based on at least one phase measurement of the at least one backscattered RFID signal, and determine whether the RFID tag is associated with the person based on the first movement vector and the second movement vector.

Aspects of the present disclosure include a non-transitory computer readable medium having instructions that, when executed by a processor, cause the processor to cause a radar to transmit at least one incident radar signal and receive at least one reflected radar signal in response to the at least one incident radar signal reflected from a person associated with the RFID tag, cause a RFID driver to transmit at least one incident RFID signal and receive at least one backscattered RFID signal from the RFID tag, determine a first movement vector of the person based on the reflected radar signal, determine a second movement vector of the RFID tag based on at least one phase measurement of the at least one backscattered RFID signal, and determine whether the RFID tag is associated with the person based on the first movement vector and the second movement vector.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In an aspect of the present disclosure, the radio frequency identification (RFID) scanner may transmit one or more incident radar signals toward a person retaining an item of merchandise with a RFID tag attached to the item of merchandise. The one or more incident radar signals may impinge on the person, and cause one or more reflected radar signals to reflect back to the RFID reader. The RFID reader may determine the movement vector (e.g., location, direction, and/or speed) of the person based on the one or more incident radar signals and the one or more reflected radar signals (e.g., time of flight).

In some aspects, the distance of the person from the RFID reader may be determined via a time-of-flight method. The speed of the person may be determined with one radar signal based on the Doppler effect. Alternatively, the speed of the person may be determined with two or more radar signals based on the change in distance and the difference is measurement time.

In some aspects, the RFID reader may transmit one or more incident RFID signals to the RFID tag. In response, the RFID tag may transmit one or more response RFID signals back to the RFID reader. In one instance, the RFID reader may measure the received signal strength indicator (RSSI) to determine the distance of the RFID tag from the RFID reader. In certain aspects of the present disclosure, the RFID reader may measure the phase shift of the one or more response RFID signals, with respect to the one or more incident RFID signals, to determine the distance between the RFID reader and the RFID tag. By determining the distance between the RFID reader and the RFID tag, the RFID reader may be able to determine the position of the RFID tag.

Figure 1:
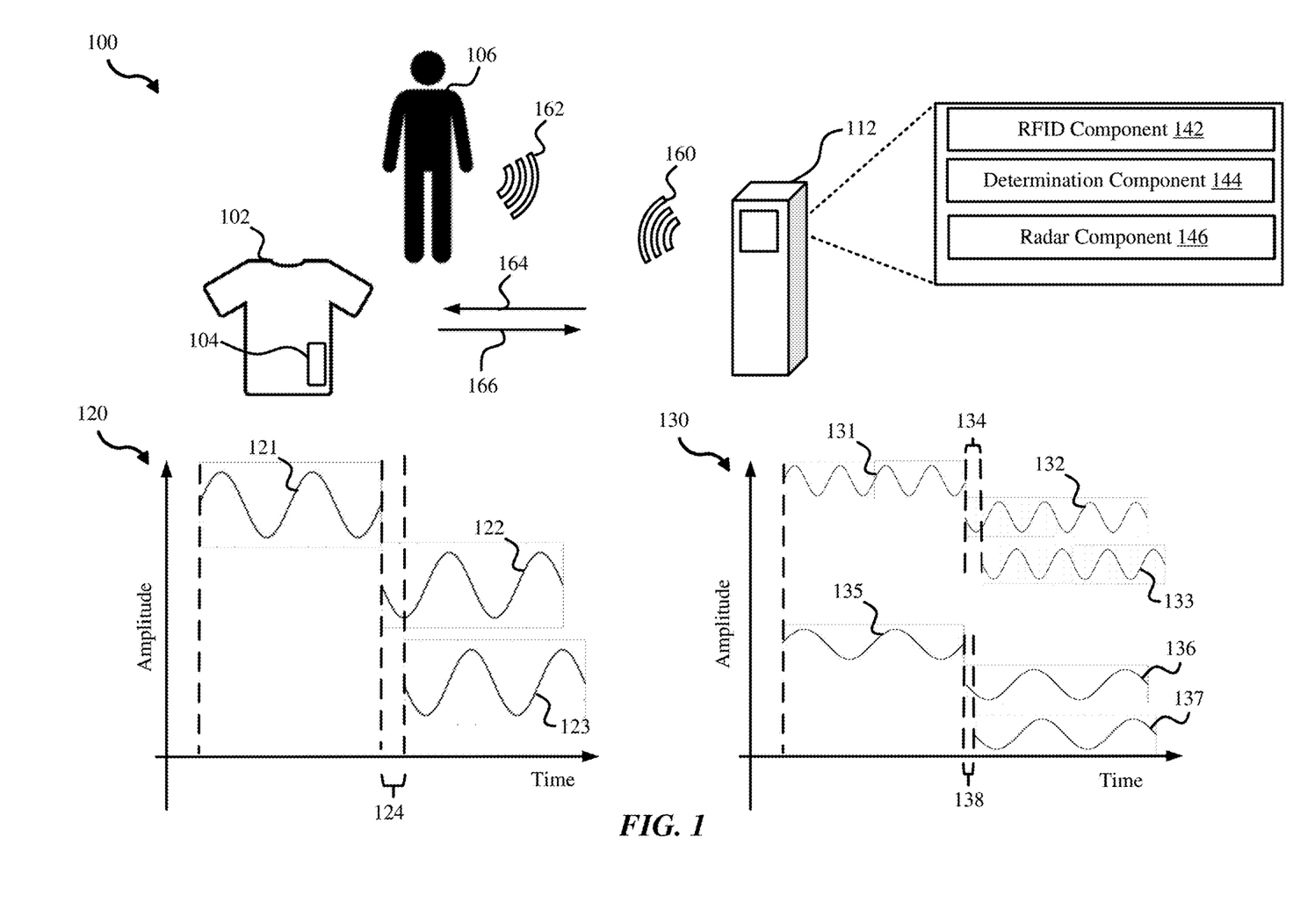
FIG. 1 illustrates an example of an environment for determining a position of a RFID tag in accordance with aspects of the present disclosure.

Referring to FIG. 1, in a non-limiting implementation, an example of an environment 100 (e.g., a retail store) for determining a movement of a person 106 and/or a RFID tag 104 may include a RFID tag 104 attached to the item of merchandise 102. The RFID tag 104 may include a RFID device 240 configured to transmit and/or receive RFID signals.

In one aspect of the present disclosure, the environment 100 may include a RFID reader 112 configured to transmit and/or receive RFID signals, and to transmit and receive radar signals. The RFID reader 112 may include a RFID component 142 configured to transmit and/or receive RFID signals. The RFID reader 112 may include a determination component 144 configured to determine a distance between the RFID tag 104 and the RFID reader 112 based on the radar signals and/or the RFID signals. The RFID reader 112 may include a radar component 146 configured to transmit and/or receive radar signals. One or more of the RFID component 142, the determination component 144, and/or the radar component 146 may be configured as hardware (e.g., application specific integrated circuit, application processors, field programmable gate arrays, etc.), software (e.g., instructions stored in a memory executed by a processor of the RFID reader 112), or a combination thereof.

During operation, in some instances, the RFID reader 112 and/or the RFID component 142 may transmit one or more incident radar signals 160 and/or one or more incident RFID signals 164 to determine a movement vector (e.g., the location, direction, and/or speed) of the person 106, the item of merchandise 102, and/or the RFID tag 104. If the movement vector of the person 106 is substantially similar to the movement vector of the RFID tag 104, the RFID reader 112 may associate the person 106 with the RFID tag 104. For example, the person 106 is possessing the item of merchandise 102 (with the RFID tag 104 attached to the item of merchandise 102).

In one instance, the radar component 146 of the RFID reader 112 may transmit the one or more incident radar signals 160. The one or more incident radar signals 160 may impinge on the person 106, and reflect back to the RFID reader 112 as one or more reflected radar signals 162. The RFID reader 112 may use a time-of-flight technique to determine the distance ($d_{radar}$) between the RFID reader 112 and the person 106. For example, the RFID reader 112 may measure the transit time a ($t_{t-radar}$) from the transmission of the one or more incident radar signals 160 and the reception of the one or more reflected radar signals 162. Based on the propagation speed ($v_{p-radar}$) of the one or more incident radar signals 160 and of the one or more reflected radar signals 162 (e.g., approximately the speed of light), the RFID reader 112 may determine the distance between the RFID reader 112 and the person 106 based on the equation $$d_{radar} = \frac{v_{p-radar}}{t_{t-radar}}.$$

In some implementations, the determination component 144 of the RFID reader 112 may utilize a plurality of incident and reflected radar signals to determine the direction the person 106 is moving, and/or the speed of the person 106. For example, the RFID reader 112 may determine the direction based on a first distance of the person 106 and the second distance of the person 106. In another example, the RFID reader 112 may determine a first distance of the person 106 at a first time, and a second distance of the person 106 at a second time. The RFID reader 112 may determine the speed based on the equation based on difference between the first distance and the second distance divided by the difference between the first time and the second time.

In some aspects, the RFID reader 112 and/or the RFID component 142 may transmit the one or more incident RFID signals 164 to the RFID tag 104. The RFID tag 104 may respond by backscattering the one or more backscattered RFID signals 166 to the RFID reader 112. The determination component 144 of the RFID reader 112 may determine the distance between the RFID reader 112 and the RFID tag 104 by calculating the received signal strength indicator (RSSI). Alternatively, the RFID reader 112 may determine the distance using the time of flight method described above. The RFID reader 112 may determine the direction and/or the speed of the RFID tag 104 (and the item of merchandise 102) as described above.

In one implementation, the RFID reader 112 and/or the RFID component 142 may determine the distance between the RFID reader 112 and the RFID tag 104 based on the phase information of the one or more incident RFID signals 164 and the one or more backscattered RFID signals 166. For example, a graph 120 illustrates waveforms used to determine the distance between the RFID reader 112 and the RFID tag 104 via phase information of a single RFID signal. The RFID reader 112 may transmit an incident RFID signal 121 to the RFID tag 104. If the distance between the RFID tag 104 and the RFID reader 112 is 0 meter (m), the RFID tag 104 may backscatter a first backscattered RFID signal 122 back to the RFID reader 112. The first backscattered RFID signal 122 may have a 180° ($\pi$ radian) phase shift with respect to the incident RFID signal 121. If the distance between the RFID tag 104 and the RFID reader 112 is greater than 0 m, the RFID tag 104 may backscatter a second backscattered RFID signal 123 back to the RFID reader 112. The second backscattered RFID signal 123 may have a phase shift greater than 180° ($\pi$ radian) with respect to the incident RFID signal 121. In some aspect, the difference in phase shift between the first backscattered RFID signal 122 and the second backscattered RFID signal 123 may be a propagation phase delay 124 (denoted as $\theta_{delay}$). Based on the propagation phase delay 124, the RFID reader 112 may be able to compute the distance ($d_{phase-1}$) using the equation $$d_{phase-1} = \frac{\theta_{delay} \cdot c}{4\pi \cdot f},$$

where c is the speed of light and f is the frequency of the incident RFID signal 121.

In some implementations, RFID reader 112 may transmit a first incident RFID signal and a second incident RFID signal. The first and second incident RFID signals may have an incident RFID wavelength λ. The RFID tag 104 may backscatter a first backscattered RFID signal in response to the first incident RFID signal and a second backscattered RFID signal in response to the second incident RFID signal. Based on a first propagation phase delay (between the first incident RFID signal and the first backscattered RFID signal) and a second propagation phase delay (between the second incident RFID signal and the second backscattered RFID signal), the RFID reader 112 may determine the movement vector (e.g., location, direction, and/or speed). However, if the RFID tag 104 moves a first distance of d when backscattering the first backscattered RFID signal and a second distance of $$\left(d + n\frac{\lambda}{a}\right)$$

when backscattering me second backscattered RFID signal (n is a positive integer, and a is 1, 2, or 4), the RFID reader 112 may be unable to determine the difference between the second distance and the first distance due to aliasing.

In some aspects of the present disclosure, the RFID reader 112 may transmit the first incident RFID signal and the second RFID signal within a threshold time to avoid aliasing. For example, the RFID reader 112 may estimate a range of time for the RFID tag 104 to move a distance of $$\frac{\lambda}{a}$$

(e.g., based on a range of movement speed of the person 106, such as 0 to 13 meters per second). The RFID reader 112 may determine the threshold time to be less than a minimum time within the range of time.

In a different implementation, the RFID reader 112 may determine the distance between the RFID reader 112 and the RFID tag 104 based on the phase information of two separate RFID signals with different frequencies. For example, a graph 130 illustrates waveforms used to determine the distance between the RFID reader 112 and the RFID tag 104 via phase information from two incident RFID signals. The RFID reader 112 may transmit a first incident RFID signal 131 having a first frequency to the RFID tag 104. If the distance between the RFID tag 104 and the RFID reader 112 is 0 m, the RFID tag 104 may backscatter a third backscattered RFID signal 132 back to the RFID reader 112. The third backscattered RFID signal 132 may have a 180° (π radian) phase shift with respect to the first incident RFID signal 131. If the distance between the RFID tag 104 and the RFID reader 112 is greater than 0 m, the RFID tag 104 may backscatter a fourth backscattered RFID signal 133 back to the RFID reader 112. The fourth backscattered RFID signal 133 may have a phase shift greater than 180° (π radian) with respect to the first incident RFID signal 131. In some aspect, the difference in phase shift between the third backscattered RFID signal 132 and the fourth backscattered RFID signal 133 may be a first propagation phase delay 134 (denoted as $\theta_{delay\text{-}1}$).

In certain implementations, the RFID reader 112 may transmit a second incident RFID signal 135 having a second frequency to the RFID tag 104. The second frequency may be different than the first frequency. If the distance between the RFID tag 104 and the RFID reader 112 is 0 m, the RFID tag 104 may backscatter a fifth backscattered RFID signal 136 back to the RFID reader 112. The fifth backscattered RFID signal 136 may have a 180°(π radian) phase shift with respect to the second incident RFID signal 135. If the distance between the RFID tag 104 and the RFID reader 112 is greater than 0 m, the RFID tag 104 may backscatter a sixth backscattered RFID signal 137 back to the RFID reader 112. The sixth backscattered RFID signal 137 may have a phase shift greater than 180° (π radian) with respect to the second incident RFID signal 135. In some aspect, the difference in phase shift between the fifth backscattered RFID signal 136 and the sixth backscattered RFID signal 137 may be a second propagation phase delay 138 (denoted as $\theta_{delay\text{-}2}$). The first propagation phase delay 134 may be the same or different than the second propagation phase delay 138.

In some implementations, based on the first propagation phase delay 134, the second propagation phase delay 138, the first frequency, and the second frequency, the RFID reader 112 may be able to compute the distance ($d_{phase\text{-}2}$) using the equation $$d_{phase\text{-}2} = \frac{(\theta_{delay\text{-}2} - \theta_{delay\text{-}1}) \cdot c}{4\pi \cdot (f_2 - f_1)},$$

where c is the speed of light, $f_1$ is the first frequency of the first incident RFID signal 131, and $f_2$ is the second frequency of the second incident RFID signal 135.

In certain aspects of the present disclosure, the RFID reader 112 may transmit more than one incident RFID signals to determine the movement vector of the RFID tag 104. For example, the RFID reader 112 may transmit a first one or a first group of RFID signals at a first time to determine the distance of the RFID tag 104 (from the RFID reader 112) at the first time, and a second one or a second group of RFID signals at a second time to determine the distance of the RFID tag 104 (from the RFID reader 112) at the second time. Based on the difference between the first distance and the second distance, and the difference between the first time and the second time, the RFID reader 112 may determine the direction and/or speed of the RFID tag 104.

In certain implementations, the RFID reader 112 may determine the movement vectors (e.g., the location, direction, and/or speed) of the person 106, the item of merchandise 102, and/or the RFID tag 104. If the movement vector of the person 106 (as determined via the one or more reflected radar signals) is substantially similar to the movement vector of the RFID tag 104 (as determined via the one or more backscattered RFID signals using the RSSI and/or the phase information), the RFID reader 112 may associate the person 106 with the RFID tag 104. Here the term "substantially similar" may indicate a correlation of 80%, 85%, 90%, 95%, or other correlation values. For example, the person 106 is possessing the item of merchandise 102 (with the RFID tag 104 attached to the item of merchandise 102). If the person 106 is moving toward an exit of the environment 100 with the item of merchandise 102 not being purchase, the RFID reader 112 may activate an alarm to alert personnel associated with the environment 100.

In some aspects of the present disclosure, the RFID reader 112 may use one or more speed measurements to filter and/or verify the movement vectors measured based on the time of flight of the radar signals, the RSSI of the RFID signals, and/or the phase information of the RFID signals as described above. For example, if speed measurement based on the RSSI values indicates a speed of the RFID tag 104 above a certain speed threshold (e.g., human running speed), such as 5 meters per second (m/s), 10 m/s, 12 m/s, 15 m/s, etc., the RFID reader 112 may discard the speed measurement based on the RSSI values. If the speed measurement based on the phase information of the RFID signals is above a certain variance threshold (e.g., 2 times, 5 times, 10 times, 20 times, etc.) higher than the speed measured based on the RSSI values and/or the time of flight of the radar signals, the RFID reader 112 may discard the speed measurement based on the phase information of the RFID signals.

Figure 2:
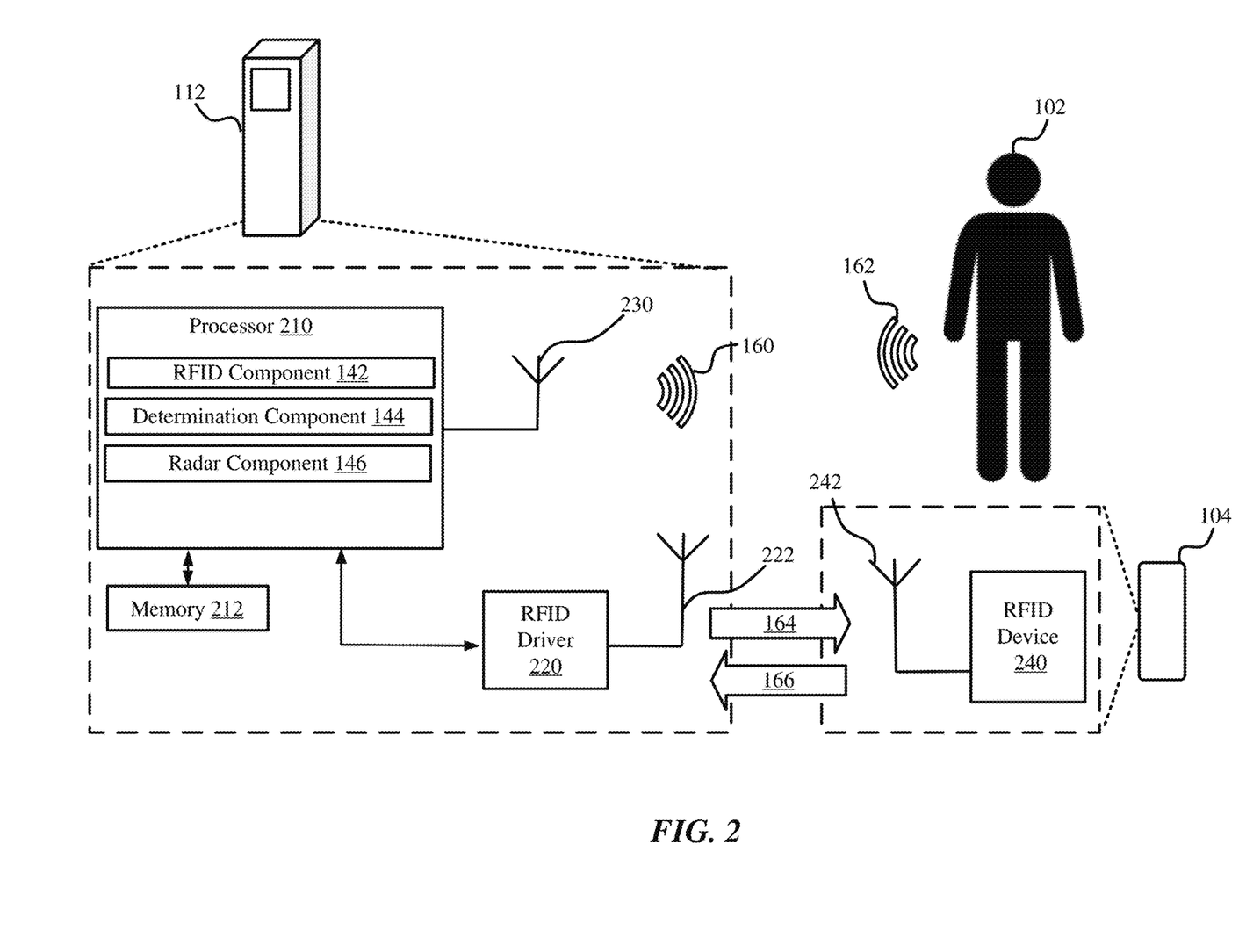
FIG. 2 illustrates an example of a radio frequency identification (RFID) scanner and a RFID tag in accordance with aspects of the present disclosure.

Referring to FIGS. 1 and 2, an example of the RFID reader 112 may be configured to transmit the one or more incident RFID signals 164 and/or receive the one or more backscattered RFID signals 166. The RFID reader 112 may include a processor 210 that executes instructions stored in a memory 212 for determining the distance based on the one or more incident RFID signals 164 and/or receive the one or more backscattered RFID signals 166 as described above. The RFID reader 112 may include the memory 212.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some implementations, the RFID reader 112 may include a RFID driver 220 configured to transmit and/or receive RFID signals via a scanner antenna 222. The RFID reader 112 may include the scanner antenna 222.

In some implementations, the processor 210 may include the RFID component 142 that causes the RFID driver 220 to transmit the one or more incident RFID signals 164, via a scanner antenna 222, to the RFID tag 104. The RFID driver 220 may energize the scanner antenna 222 to transmit the one or more incident RFID signals 164. The scanner antenna 222 may include one or more inductors that transmit or receive electromagnetic signals. Alternatively or additionally, the scanner antenna 222 may be a dipole antenna. The RFID component 142 may cause the RFID driver 220 to receive the one or more backscattered RFID signals 166 via the scanner antenna 222.

In certain implementations, the processor 210 may include the determination component 144 that determines the distance between the RFID tag 104 and RFID reader 112.

In an implementation, the processor 210 may include the radar component 146 that causes a radar 230 to transmit the one or more incident radar signals 160 and/or receive the one or more reflected radar signals 162.

In some implementations, RFID reader 112 may include the radar 230 configured to transmit and/or receive radar signals. The radar 230 may be a millimeter wave radar. The frequency of the radar 230 may range from 1 gigahertz (GHz) to 150 GHz. Other suitable systems (such as a laser radar, sonar, and/or optical devices) may also be employed. The radar 230 may rotationally scan the environment 100. The radar 230 may raster scan the environment 100. For example, the radar 230 may scan a plane parallel to the floor of the environment 100 (e.g., floor of the retail store). Based on the direction of the scan and the distance from the RFID reader 112, the determination component 144 may determine the position (distance and angle) of the person 106 with respect to the RFID reader 112.

Additionally, in some non-limiting examples, the RFID tag 104 may include the RFID device 240 that backscatters the one or more backscattered RFID signals 166 and/or receives the one or more incident RFID signals 164 via a tag antenna 242.

Figure 3:
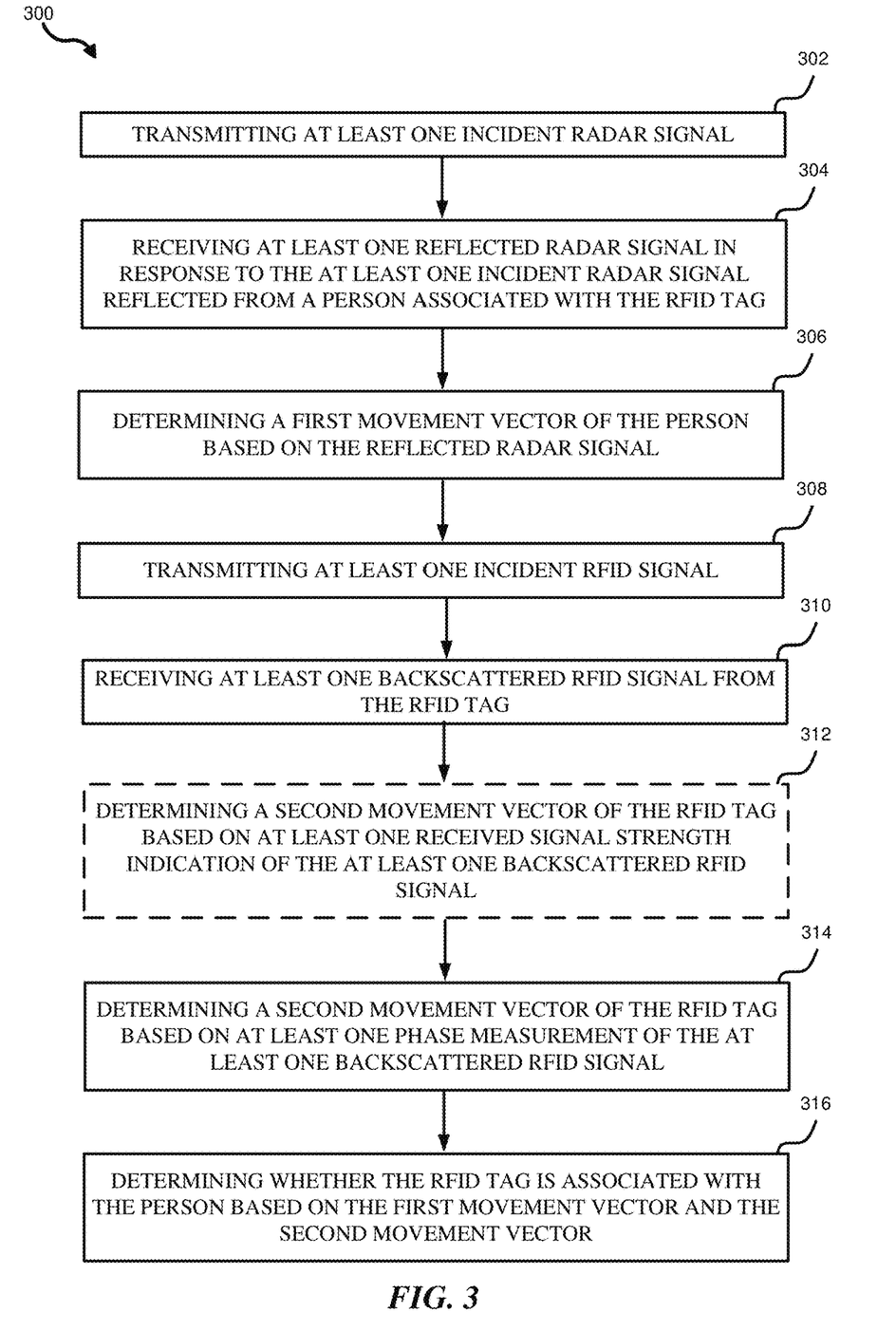
FIG. 3 illustrates an example of a method for determining a position of a RFID tag and/or a person accordance with aspects of the present disclosure.

Turning to FIG. 3, an example of a method 300 for determining a position of the RFID tag 104 and/or the person 106 may be performed by the RFID reader 112. Specifically, the method 300 may be performed by one or more of the processor 210, the RFID component 142, the determination component 144, the radar component 146, the memory 212, the RFID driver 220, the scanner antenna 222, and/or the radar 230.

At block 302, the method 300 may transmit at least one incident radar signal. For example, the processor 210, the memory 212, the radar component 146, and/or the radar 230 may transmit the one or more incident radar signals 160 as described above.

At block 304, the method 300 may receive at least one reflected radar signal in response to the at least one incident radar signal reflected from a person associated with the RFID tag. For example, the processor 210, the memory 212, the processor 210, the memory 212, the radar component 146, and/or the radar 230 may receive the one or more reflected radar signals 162 as described above.

At block 306, the method 300 may determine a first movement vector of the person based on the reflected radar signal. For example, the processor 210, the memory 212, and/or the determination component 144 may determine a first movement vector of the person 106 based on the one or more reflected radar signals 162 as described above.

At block 308, the method 300 may transmit at least one incident RFID signal. For example, the processor 210, the memory 212, the RFID component 142, the RFID driver 220, and/or the scanner antenna 222 may transmit the one or more incident RFID signals 164 as described above.

At block 310, the method 300 may receive at least one backscattered RFID signal from the RFID tag. For example, the processor 210, the memory 212, the RFID component 142, the RFID driver 220, and/or the scanner antenna 222 may receive the one or more backscattered RFID signals 166 as described above.

At block 312, the method 300 may optionally determine an optional movement vector of the RFID tag based on at least one received signal strength indication of the at least one backscattered RFID signal. For example, the processor 210, the memory 212, and/or the determination component 144 may determine an optional movement vector of the RFID tag 104 based on at least on the RSSI of the one or more backscattered RFID signals 166 as described above.

At block 314, the method 300 may determine a second movement vector of the RFID tag based on at least one phase measurement of the at least one backscattered RFID signal. For example, the processor 210, the memory 212, and/or the determination component 144 may determine a second movement vector of the RFID tag 104 based on the phase information of the one or more backscattered RFID signals 166 as described above.

At block 316, the method 300 may determine whether the RFID tag is associated with the person based on the first movement vector and the second movement vector. For example, the processor 210, the memory 212, and/or the determination component 144 may determine whether the RFID tag 104 is associated with the person 106 based on the first movement vector, the second movement vector, and the third movement vector as described above.

Figure 4:
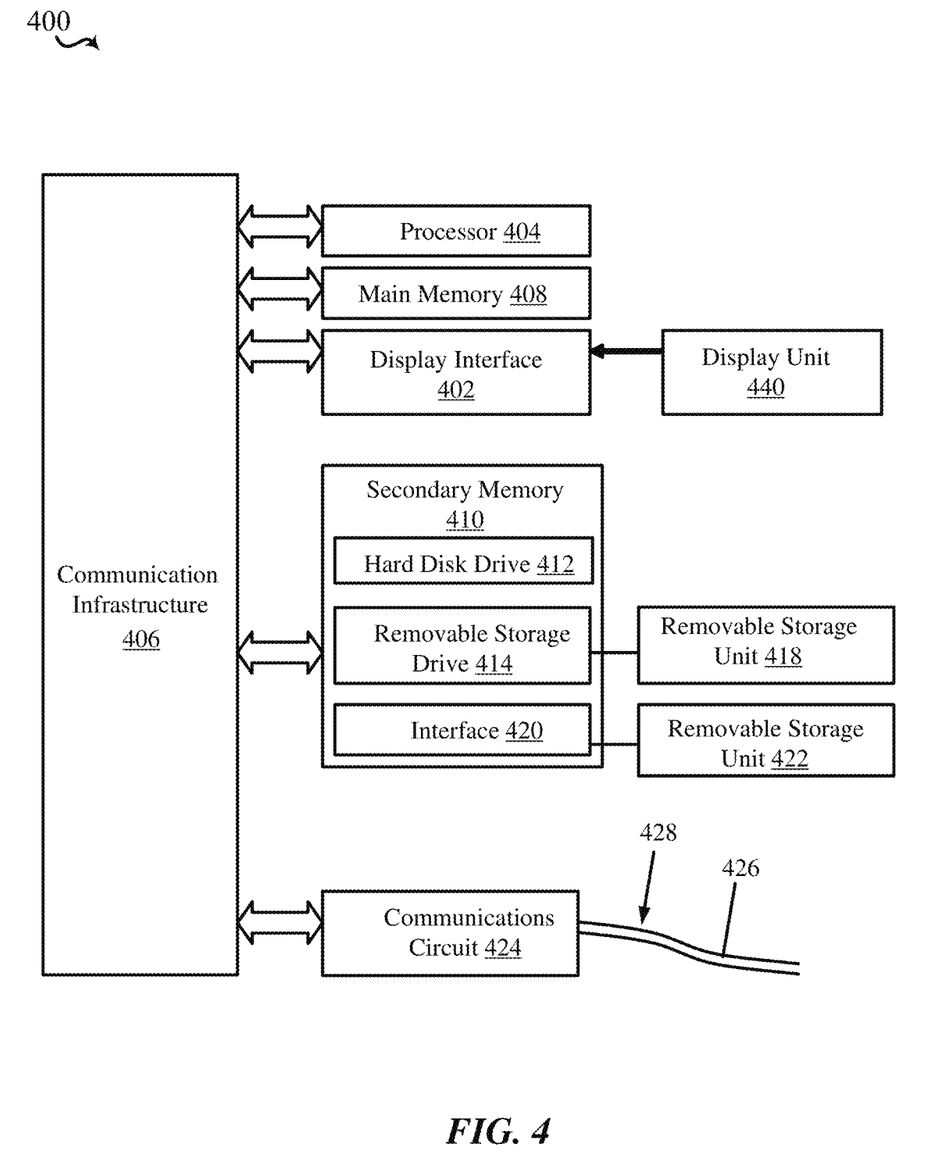
FIG. 4 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 400 is shown in FIG. 4. In some examples, the RFID reader 112 may be implemented as the computer system 400 shown in FIG. 4. The RFID reader 112 may include some or all of the components of the computer system 400.

The computer system 400 includes one or more processors, such as processor 404. The processor 404 is connected with a communication infrastructure 406 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 400 may include a display interface 402 that forwards graphics, text, and other data from the communication infrastructure 406 (or from a frame buffer not shown) for display on a display unit 450. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, a magnetic tape drive, an optical disk drive, a universal serial bus (USB) flash drive, etc. The removable storage drive 414 reads from and/or writes to a removable storage unit 418 in a well-known manner. Removable storage unit 418 represents a floppy disk, magnetic tape, optical disk, USB flash drive etc., which is read by and written to removable storage drive 414. As will be appreciated, the removable storage unit 418 includes a computer usable storage medium having stored therein computer software and/or data. In some examples, one or more of the main memory 408, the secondary memory 410, the removable storage unit 418, and/or the removable storage unit 422 may be a non-transitory memory.

Alternative aspects of the present disclosures may include secondary memory 410 and may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and the removable storage unit 422 and the interface 420, which allow software and data to be transferred from the removable storage unit 422 to computer system 400.

Computer system 400 may also include a communications circuit 424. The communications circuit 424 may allow software and data to be transferred between computer system 400 and external devices. Examples of the communications circuit 424 may include a modem, a network interface (such as an Ethernet card), a communications port, a Personal Computer Memory Card International Association (PCMCIA) slot and card, etc. Software and data transferred via the communications circuit 424 are in the form of signals 428, which may be electronic, electromagnetic, optical or other signals capable of being received by the communications circuit 424. These signals 428 are provided to the communications circuit 424 via a communications path (e.g., channel) 426. This path 426 carries signals 428 and may be implemented using wire or cable, fiber optics, a telephone line, a cellular link, an RF link and/or other communications channels. In this document, the terms "computer program medium" and "computer usable medium" are used to refer generally to media such as the removable storage unit 418, a hard disk installed in hard disk drive 412, and signals 428. These computer program products provide software to the computer system 400. Aspects of the present disclosures are directed to such computer program products.

Computer programs (also referred to as computer control logic) are stored in main memory 408 and/or secondary memory 410. Computer programs may also be received via communications circuit 424. Such computer programs, when executed, enable the computer system 400 to perform the features in accordance with aspects of the present disclosures, as discussed herein. In particular, the computer programs, when executed, enable the processor 404 to perform the features in accordance with aspects of the present disclosures. Accordingly, such computer programs represent controllers of the computer system 400.

In an aspect of the present disclosures where the method is implemented using software, the software may be stored in a computer program product and loaded into computer system 400 using removable storage drive 414, hard disk drive 412, or the interface 420. The control logic (software), when executed by the processor 404, causes the processor 404 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method by a radio frequency identification (RFID) scanner to determine a position of a RFID tag in a retail store, comprising:
transmitting at least one incident radar signal;
receiving at least one reflected radar signal in response to the at least one incident radar signal reflected from a person associated with the RFID tag;
determining a first movement vector of the person based on the reflected radar signal;
transmitting at least one incident RFID signal;
receiving at least one backscattered RFID signal from the RFID tag;
determining a second movement vector of the RFID tag based on at least one phase measurement of the at least one backscattered RFID signal;
determining whether the RFID tag is associated with the person based on the first movement vector and the second movement vector, wherein determining whether the RFID tag is associated with the person comprises determining whether the first movement vector is substantially identical to the second movement vector; and
in response to determining that the RFID tag is associated with the person:
determining whether the first movement vector indicates that the person is exiting the retail store;
determining whether a merchandise associated with the RFID tag has been purchased; and
activating an alarm in response to the person exiting the retail store and the merchandise has not been purchased.

2. The method of claim 1, wherein:
transmitting the at least one incident radar signal comprises transmitting a plurality of incident radar signals each toward a different direction of a plurality of directions; and
receiving the at least one reflected radar signal comprises receiving a plurality of reflected radar signals in response to the plurality of incident radar signals.

3. The method of claim 2, wherein:
transmitting the at least one incident radar signal comprises:
transmitting a first incident radar signal of the plurality of incident radar signals toward a first direction of a plurality of directions;
transmitting a second incident radar signal of the plurality of incident radar signals toward a second direction of a plurality of directions;
receiving the at least one reflected radar signal comprises;
receiving a first reflected radar signal of the plurality of reflected radar signals in response to the first incident radar signal impinging on the person at a first time;
receiving a second reflected radar signal of the plurality of reflected radar signals in response to the second incident radar signal impinging on the person at a second time;
determining the first movement vector comprises:
measuring a first transmit time between transmitting the first incident radar signal of the plurality of incident radar signals and receiving the first reflected radar signal of the plurality of reflected radar signals;
measuring a second transmit time between transmitting the second incident radar signal of the plurality of incident radar signals and receiving the second reflected radar signal of the plurality of reflected radar signals;
determining a first position of the person based on the first transit time and the first direction;
determining a second position of the person based on the second transit time and the second direction; and
determining the first movement vector based on the first position and the second position.

4. The method of claim 3, further comprising determining a first velocity of the person based on the first position, the second position, and a lapse time, wherein the lapse time is a difference between the first time and the second time.

5. The method of claim 1, wherein:
transmitting the at least one incident RFID signal comprises transmitting a first incident RFID signal and a second incident RFID signal;
receiving the at least one backscattered RFID signal from the RFID tag comprises receiving a first backscattered RFID signal in response to the first incident RFID signal impinging on the RFID tag at a first time and a second backscattered RFID signal in response to the second incident RFID signal impinging on the RFID tag at a second time; and
determining the second movement vector comprises:
determining a first phase shift between the first incident RFID signal and the first backscattered RFID signal;
determining a second phase shift between the second incident RFID signal and the second backscattered RFID signal;
determining a first position of the RFID tag based on the first phase shift;
determining a second position of the RFID tag based on the second phase shift; and
determining the second movement vector based on the first position and the second position.

6. The method of claim 5, further comprising determining a third velocity based on the first position, the second position, and a lapse time, wherein the lapse time is a difference between the first time and the second time.

7. The method of claim 1, wherein:
transmitting the at least one incident RFID signal comprises:
transmitting a first incident RFID signal and a second incident RFID signal at a first frequency;
transmitting a third incident RFID signal and a fourth incident RFID signal at a second frequency; and
receiving the at least one backscattered RFID signal from the RFID tag comprises:
receiving a first backscattered RFID signal in response to the first incident RFID signal impinging on the RFID tag at a first time and a second backscattered RFID signal in response to the second incident RFID signal impinging on the RFID tag at a second time; and
receiving a third backscattered RFID signal in response to the third incident RFID signal impinging on the RFID tag at the first time and a fourth backscattered RFID signal in response to the fourth incident RFID signal impinging on the RFID tag at the second time.

8. The method of claim 7, wherein determining the second movement vector comprises:
determining a first phase shift between the first incident RFID signal and the first backscattered RFID signal;

determining a second phase shift between the second incident RFID signal and the second backscattered RFID signal;
determining a third phase shift between the third incident RFID signal and the third backscattered RFID signal;
determining a fourth phase shift between the fourth incident RFID signal and the fourth backscattered RFID signal;
determining a frequency difference between the first frequency and the second frequency;
determining a first position of the RFID tag based on a first phase difference between the first phase shift and the third phase shift, and the frequency difference;
determining a second position of the RFID tag based on a second phase difference between the second phase shift and the fourth phase shift, and the frequency difference; and
determining the second movement vector based on the first position and the second position.

9. The method of claim 8, further comprising determining a third velocity based on the first position, the second position, and a lapse time, wherein the lapse time is a difference between the first time and the second time.

10. A RFID reader, comprising:
a radar configured to:
  transmit at least one incident radar signal;
  receive at least one reflected radar signal in response to the at least one incident radar signal reflected from a person associated with the RFID tag;
a RFID driver configured to:
  transmit at least one incident RFID signal;
  receive at least one backscattered RFID signal from the RFID tag; and
a processor configured to:
  determine a first movement vector of the person based on the reflected radar signal;
  determine a second movement vector of the RFID tag based on at least one phase measurement of the at least one backscattered RFID signal;
  determine whether the RFID tag is associated with the person based on the first movement vector and the second movement vector, wherein determining whether the RFID tag is associated with the person comprises determining whether the first movement vector is substantially identical to the second movement vector; and
  in response to determining that the RFID tag is associated with the person:
    determine whether the first movement vector indicates that the person is exiting the retail store;
    determine whether a merchandise associated with the RFID tag has been purchased; and
    activate an alarm in response to the person exiting the retail store and the merchandise has not been purchased.

11. The RFID reader of claim 10, wherein the radar is further configured to:
transmit a plurality of incident radar signals each toward a different direction of a plurality of directions; and
receive a plurality of reflected radar signals in response to the plurality of incident radar signals.

12. The RFID reader of claim 11, wherein:
transmitting the at least one incident radar signal comprises:
  transmitting a first incident radar signal of the plurality of incident radar signals toward a first direction of a plurality of directions;
  transmitting a second incident radar signal of the plurality of incident radar signals toward a second direction of a plurality of directions;
receiving the at least one reflected radar signal comprises;
  receiving a first reflected radar signal of the plurality of reflected radar signals in response to the first incident radar signal impinging on the person at a first time;
  receiving a second reflected radar signal of the plurality of reflected radar signals in response to the second incident radar signal impinging on the person at a second time;
determining the first movement vector comprises:
  measuring a first transmit time between transmitting the first incident radar signal of the plurality of incident radar signals and receiving the first reflected radar signal of the plurality of reflected radar signals;
  measuring a second transmit time between transmitting the second incident radar signal of the plurality of incident radar signals and receiving the second reflected radar signal of the plurality of reflected radar signals;
  determining a first position of the person based on the first transit time and the first direction;
  determining a second position of the person based on the second transit time and the second direction; and
  determining the first movement vector based on the first position and the second position.

13. The RFID reader of claim 12, wherein the processor is further configured to determine a first velocity of the person based on the first position, the second position, and a lapse time, wherein the lapse time is a difference between the first time and the second time.

14. The RFID reader of claim 10, wherein:
transmitting the at least one incident RFID signal comprises transmitting a first incident RFID signal and a second incident RFID signal;
receiving the at least one backscattered RFID signal from the RFID tag comprises receiving a first backscattered RFID signal in response to the first incident RFID signal impinging on the RFID tag at a first time and a second backscattered RFID signal in response to the second incident RFID signal impinging on the RFID tag at a second time; and
determining the second movement vector comprises:
  determining a first phase shift between the first incident RFID signal and the first backscattered RFID signal;
  determining a second phase shift between the second incident RFID signal and the second backscattered RFID signal;
  determining a first position of the RFID tag based on the first phase shift;
  determining a second position of the RFID tag based on the second phase shift; and
  determining the second movement vector based on the first position and the second position.

15. The RFID reader of claim 14, wherein the processor is further configured to determine a third velocity based on the first position, the second position, and a lapse time, wherein the lapse time is a difference between the first time and the second time.

16. The RFID reader of claim 10, wherein:
transmitting the at least one incident RFID signal comprises:
  transmitting a first incident RFID signal and a second incident RFID signal at a first frequency;
  transmitting a third incident RFID signal and a fourth incident RFID signal at a second frequency; and receiving the at least one backscattered RFID signal from the RFID tag comprises:
receiving a first backscattered RFID signal in response to the first incident RFID signal impinging on the RFID tag at a first time and a second backscattered RFID signal in response to the second incident RFID signal impinging on the RFID tag at a second time;
receiving a third backscattered RFID signal in response to the third incident RFID signal impinging on the RFID tag at the first time and a fourth backscattered RFID signal in response to the fourth incident RFID signal impinging on the RFID tag at the second time.

17. The RFID reader of claim 10, wherein determining the second movement vector comprises:
determining a first phase shift between the first incident RFID signal and the first backscattered RFID signal;
determining a second phase shift between the second incident RFID signal and the second backscattered RFID signal;
determining a third phase shift between the third incident RFID signal and the third backscattered RFID signal;
determining a fourth phase shift between the fourth incident RFID signal and the fourth backscattered RFID signal;
determining a frequency difference between the first frequency and the second frequency;
determining a first position of the RFID tag based on a first phase difference between the first phase shift and the third phase shift, and the frequency difference;
determining a second position of the RFID tag based on a second phase difference between the second phase shift and the fourth phase shift, and the frequency difference; and
determining the second movement vector based on the first position and the second position.

18. The RFID reader of claim 17, wherein the processor is further configured to determine a third velocity based on the first position, the second position, and a lapse time, wherein the lapse time is a difference between the first time and the second time.

19. A non-transitory computer readable medium comprising instructions that, when executed by a processor, cause the processor to:
cause a radar to:
transmit at least one incident radar signal;
receive at least one reflected radar signal in response to the at least one incident radar signal reflected from a person associated with the RFID tag, cause a RFID driver to:
transmit at least one incident RFID signal;
receive at least one backscattered RFID signal from the RFID tag;
determine a first movement vector of the person based on the reflected radar signal;
determine a second movement vector of the RFID tag based on at least one phase measurement of the at least one backscattered RFID signal;
determine whether the RFID tag is associated with the person based on the first movement vector and the second movement vector, wherein determining whether the RFID tag is associated with the person comprises determining whether the first movement vector is substantially identical to the second movement vector; and
in response to determining that the RFID tag is associated with the person:
determine whether the first movement vector indicates that the person is exiting the retail store;
determine whether a merchandise associated with the RFID tag has been purchased; and
activate an alarm in response to the person exiting the retail store and the merchandise has not been purchased.

20. A method by a radio frequency identification (RFID) scanner to determine a position of a RFID tag in a retail store, comprising:
transmitting a first incident radar signal of the plurality of incident radar signals toward a first direction of a plurality of directions;
transmitting a second incident radar signal of the plurality of incident radar signals toward a second direction of a plurality of directions;
receiving a first reflected radar signal of the plurality of reflected radar signals in response to the first incident radar signal impinging on the person at a first time;
receiving a second reflected radar signal of the plurality of reflected radar signals in response to the second incident radar signal impinging on the person at a second time;
measuring a first radar transmit time between transmitting the first incident radar signal of the plurality of incident radar signals and receiving the first reflected radar signal of the plurality of reflected radar signals;
measuring a second radar transmit time between transmitting the second incident radar signal of the plurality of incident radar signals and receiving the second reflected radar signal of the plurality of reflected radar signals;
determining a first position of the person based on the first radar transit time and the first direction;
determining a second position of the person based on the second radar transit time and the second direction;
determining a first movement vector based on the first position and the second position;
transmitting a first incident RFID signal having a wavelength;
transmitting a second incident RFID signal having the wavelength within a threshold duration after the first incident RFID signal, wherein the threshold duration is less than an estimated time for the RFID tag to move one-fourth or one-half of the wavelength;
receiving a first backscattered RFID signal in response to the first incident RFID signal impinging on the RFID tag at a first time;
receiving a second backscattered RFID signal in response to the second incident RFID signal impinging on the RFID tag at a second time;
determining a first phase shift between the first incident RFID signal and the first backscattered RFID signal;
determining a second phase shift between the second incident RFID signal and the second backscattered RFID signal;
determining a first position of the RFID tag based on the first phase shift;
determining a second position of the RFID tag based on the second phase shift; and
determining the second movement vector based on the first position and the second position.

* * * * *